US009689976B2

(12) United States Patent
Parker et al.

(10) Patent No.: US 9,689,976 B2
(45) Date of Patent: Jun. 27, 2017

(54) DETERENT FOR UNMANNED AERIAL SYSTEMS

(71) Applicant: XIDRONE SYSTEMS, INC., Naples, FL (US)

(72) Inventors: Dwaine A. Parker, Naples, FL (US); Damon E. Stern, Riverview, FL (US); Lawrence S. Pierce, Huntsville, AL (US)

(73) Assignee: XiDrone Systems, Inc., Naples, FL (US)

( * ) Notice: Subject to any disclaimer, the term of this patent is extended or adjusted under 35 U.S.C. 154(b) by 176 days.

(21) Appl. No.: 14/821,907

(22) Filed: Aug. 10, 2015

(65) Prior Publication Data
US 2016/0245907 A1    Aug. 25, 2016

Related U.S. Application Data

(60) Provisional application No. 62/094,154, filed on Dec. 19, 2014.

(51) Int. Cl.
  *G01S 13/86*  (2006.01)
  *G01S 13/88*  (2006.01)
  (Continued)

(52) U.S. Cl.
  CPC .............. *G01S 13/06* (2013.01); *F41H 11/02* (2013.01); *F41H 13/0075* (2013.01);
  (Continued)

(58) Field of Classification Search
  CPC . G01S 7/021; G01S 7/38; G01S 7/414; G01S 13/42; G01S 13/52; G01S 13/5244;
  (Continued)

(56) References Cited

U.S. PATENT DOCUMENTS 3,981,010 A * 9/1976 Michelsen ............ F41G 3/2611
                                                    342/125
5,005,147 A * 4/1991 Krishen ................ G06K 9/6293
                                                    703/13
(Continued)

FOREIGN PATENT DOCUMENTS

FR    2983973 A1    6/2013
GB    2536043 A     9/2016

OTHER PUBLICATIONS

Andrew J. Kerns et al, Unmanned Aircraft Capture and Control via GPS Spoofing, Journal of Robotics, vol. 31, No. 4, Jul. 2014.
(Continued)

*Primary Examiner* — Peter Bythrow
(74) *Attorney, Agent, or Firm* — Nixon & Vanderhye P.C.

(57) ABSTRACT

A system for providing integrated detection and countermeasures against unmanned aerial vehicles include a detecting element, an location determining element and an interdiction element. The detecting element detects an unmanned aerial vehicle in flight in the region of, or approaching, a property, place, event or very important person. The location determining element determines the exact location of the unmanned aerial vehicle. The interdiction element can either direct the unmanned aerial vehicle away from the property, place, event or very important person in a non-destructive manner, or can cause disable the unmanned aerial vehicle in a destructive manner.

7 Claims, 4 Drawing Sheets

(51) Int. Cl.
F41H 13/00 (2006.01)
F41H 11/02 (2006.01)
G01S 13/06 (2006.01)
G01S 3/782 (2006.01)
G01S 7/41 (2006.01)
G01S 13/42 (2006.01)
G01S 7/02 (2006.01)
G01S 7/38 (2006.01)
G01S 13/93 (2006.01)
G01S 13/91 (2006.01)

(52) U.S. Cl.
CPC ............ G01S 3/782 (2013.01); G01S 7/021 (2013.01); G01S 7/38 (2013.01); G01S 7/414 (2013.01); G01S 13/42 (2013.01); G01S 13/86 (2013.01); G01S 13/88 (2013.01); G01S 13/883 (2013.01); G01S 13/91 (2013.01); G01S 13/9303 (2013.01)

(58) Field of Classification Search
CPC ...... G01S 13/86; G01S 13/865; G01S 13/867; G01S 13/88; G01S 13/883; F41H 11/00; F41H 11/02; F41H 13/0043; F41H 13/0075
USPC ................................................ 342/14, 52–56
See application file for complete search history.

(56) References Cited

U.S. PATENT DOCUMENTS

| | | | | |
|---|---|---|---|---|
| 5,268,680 A * | 12/1993 | Zantos | ............... | F41G 7/008 342/53 |
| 5,381,150 A | 1/1995 | Hawkins | | |
| 6,081,764 A * | 6/2000 | Varon | ............... | G08G 5/045 342/29 |
| 6,529,820 B2 * | 3/2003 | Tomescu | ............... | G01S 5/0063 342/36 |
| 6,707,052 B1 * | 3/2004 | Wild | ............... | F41H 11/02 250/504 R |
| 7,202,809 B1 * | 4/2007 | Schade | ............... | F41A 1/08 244/3.1 |
| 7,437,225 B1 * | 10/2008 | Rathinam | ............... | G08G 5/0013 340/961 |
| 7,492,308 B2 * | 2/2009 | Benayahu | ............... | F41H 7/00 244/3.1 |
| 7,551,121 B1 * | 6/2009 | O'Connell | ............... | F41G 5/08 235/400 |
| 7,619,555 B2 * | 11/2009 | Rolfe | ............... | G08G 5/0013 342/29 |
| 8,212,709 B2 * | 7/2012 | Bradley | ............... | F41G 7/224 244/3.1 |
| 8,258,994 B2 * | 9/2012 | Hamilton | ............... | F41G 7/224 244/3.1 |
| 8,258,998 B2 * | 9/2012 | Factor | ............... | G01S 7/36 342/12 |
| 8,330,641 B2 * | 12/2012 | Ryden | ............... | H04K 3/45 342/14 |
| 8,464,949 B2 * | 6/2013 | Namey | ............... | F41H 5/007 235/404 |
| 9,495,877 B2 * | 11/2016 | Duffy | ............... | G08G 5/0013 |
| 2006/0028373 A1 * | 2/2006 | Fullerton | ............... | F41H 11/00 342/67 |
| 2008/0018519 A1 * | 1/2008 | Berg | ............... | F41G 5/08 342/14 |
| 2010/0315281 A1 * | 12/2010 | Askelson | ............... | G01S 7/003 342/30 |
| 2012/0217301 A1 * | 8/2012 | Namey | ............... | F41H 5/007 235/411 |
| 2014/0102288 A1 * | 4/2014 | Yeshurun | ............... | F41H 5/007 89/36.17 |
| 2014/0251123 A1 * | 9/2014 | Venema | ............... | F41G 3/16 89/41.22 |
| 2014/0266851 A1 * | 9/2014 | Fink | ............... | G01S 7/36 342/14 |
| 2015/0254988 A1 * | 9/2015 | Wang | ............... | G05D 1/0214 701/3 |

OTHER PUBLICATIONS

Ying Gao et al, "Design and Realization of Virtual Scene System in UAV Electronic Warfare", Information Engineering and Computer Science, 2009. ICIECS 2009. International Conference on. IEEE, Piscataway, NJ, Dec. 19, 2009.

"In the battle for Mosul, grenades rain down from ISIS drones," Rudaw, Jan. 7, 2017, 3 pages.

"Liteye and Tribalco Team to Deliver AUDS Counter Drone Systems to U.S. Military Customers," PR Newswire, Jan. 12, 2017, 3 pages.

Watson, Ben, "The Drones of ISIS," Defense One, Jan. 12, 2017, 10 pages.

* cited by examiner

DETERENT FOR UNMANNED AERIAL SYSTEMS

This is a nonprovisional application claiming priority of provisional application Ser. No. 62/094,154 filed Dec. 19, 2014.

FIELD OF THE INVENTION

The present invention relates to an integrated detection and countermeasure solution against unmanned aerial systems, which are commonly referred to as drones.

BACKGROUND OF THE INVENTION

Unmanned aerial systems, which are commonly referred to as drones, have become commercially available to the general public. While there may be many safe commercial and recreational uses for unmanned aerial systems these devices may potentially pose hazards to commercial and general aviation, the public, and private and government property if improperly operated. Furthermore unmanned aerial systems may be used to violate the privacy of personal, commercial, educational, athletic, entertainment and governmental activities. Most unfortunately unmanned aerial systems may potentially be used in the furtherance of invading privacy, or carrying out terrorist and/or criminal activities. There is a need for a device and method of detecting the approach of an unmanned aerial system towards a location where personal, public, commercial, educational, athletic, entertainment and governmental activities occur and where an unmanned aerial system could potentially be used for invading privacy, or carrying out terrorist and criminal activities. The present invention provides an integrated detection and countermeasure solution against unmanned aerial systems and offers increased security, privacy, and protection from the threats of violence involving small unmanned aerial vehicles/systems (sUAS) and is applicable to governmental, commercial, private, and public concerns.

SUMMARY OF THE INVENTION

There is provided in accordance with the present invention a system that detects, identifies, tracks, deters and or interdicts small unmanned aerial vehicles/systems (sUAS) from ground level to several thousand feet above ground level. The system disclosed herein is an integrated solution comprising components using: existing technology for a new use; multiplexing hardware components designed for this application; and development of the integrating software which calculates the exact x, y, z coordinates of the subject sUAS; subject sUAS RF signal analysis to determine the most appropriate RF signal characteristics to affect the subject sUAS; precision alignment of high definition electro-optical (EO) sensors and infrared (IR) sensors and image recognition algorithms providing confirmation that the subject sUAS is in violation of airspace authorization. The integration of these components via the herein disclosed combination of software and hardware is novel, not related to existing art in purpose, is non-obvious, and provides a useful solution to uninvited, invasive and potentially hazardous sUAS operations.

The system of the present invention provides an integrated and diversified solution that can be deployed as a "permanent placement" or mobile system on land, sea, or air platform.

The system of the invention may be strategically deployed to monitor the airspace around a protected interest such as a property, place, event or very important person (VIP) offering 360 degree azimuth coverage extending from the receiving antennae of the system out to a maximum lateral distance of about 2 kilometers (6560 feet) and within the lateral boundaries up to a maximum altitude of about 1.5 kilometers (4920 feet) above ground level (AGL).

DETAILED DESCRIPTION OF THE INVENTION

Part Numbers
  10 Transmitting multi band high gain directional antenna array with vertical polarity
  12 Receive directional antenna array
  14 Receive Omni antenna array
  16 EO/IR (Electro Optical/Infra Red) sensor
  18 Automatic antenna alignment assembly
  20 Multi-band LNA assembly
  22 Automatic antenna alignment assembly
  24 High fidelity RF receivers/host work station CPU
  26 Azimuth and elevation vector coordinate data processor
  28 Empower 1189-BBM3 wideband HPA assembly
  30 Receive blanking
  32 Direction detect and range estimation
  34 Key sight N9310A RF signal generator with multiple modulation sources
  36 Spectral signals detect and type identification
  38 ECM modulation type select
  40 Frequency and waveform parameters
  42 Modulation database
  43 Commercial 4 k X band radar
  44 Subject UAS (Unmanned Aerial System)
  45 Radar clutter and target filter processor
  46 Azimuth and elevation vector coordinate data processor
  99 System power and status monitor
  100 Entire system
  102 Countermeasure and deterrent section of entire system
  103 Radio Frequency (RF) detection section of entire system
  104 Radar detection section of entire system
  105 Electro Optical and Infer Red (EO/IR) detection section of entire system
  Glossary As used herein and in the claims each of the terms defined in this glossary is understood to have the meaning set forth in this glossary.

Figure 1:
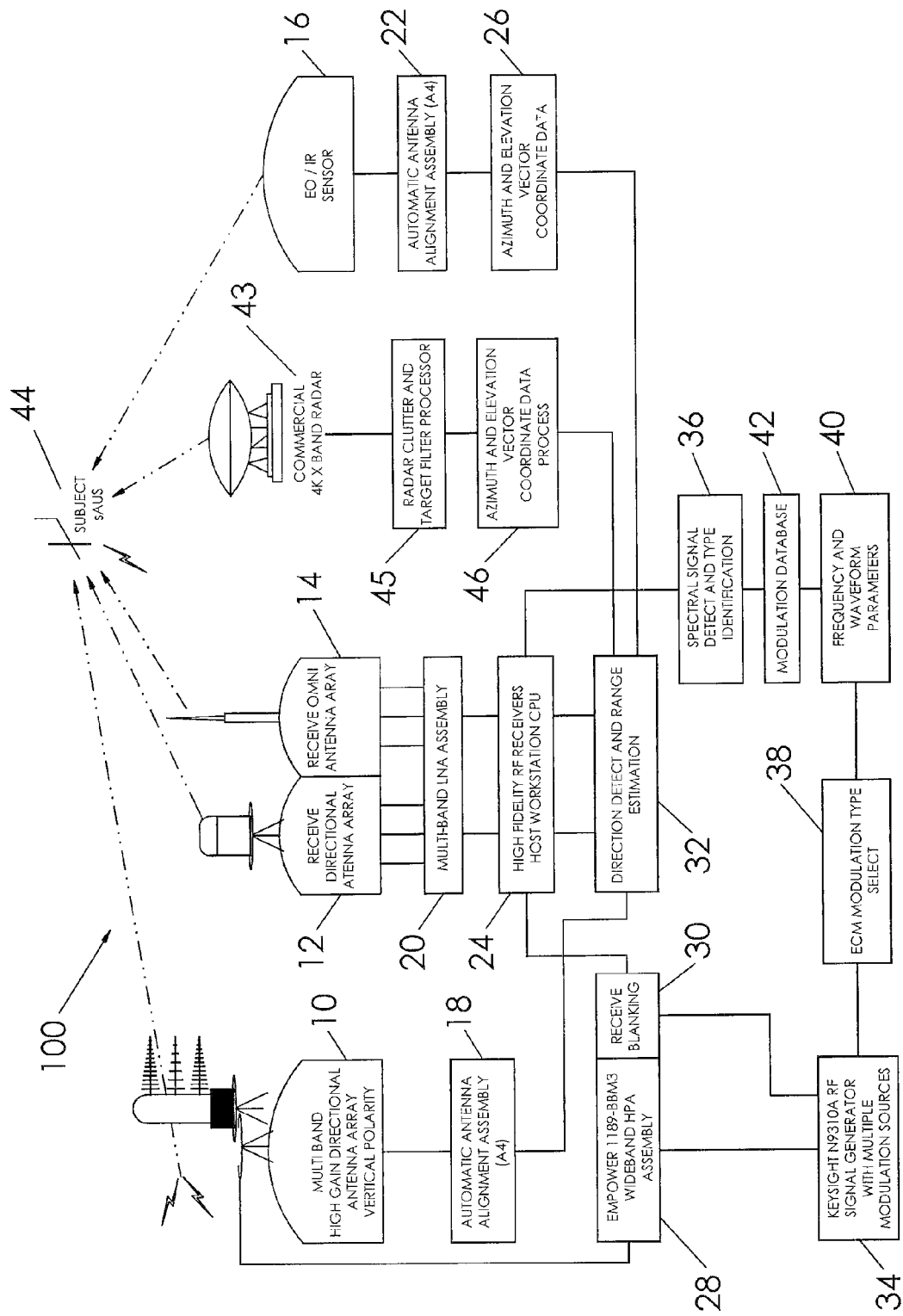
FIG. 1 is a schematic representation of the components and function of an integrated detection and countermeasure system for use against unmanned aerial systems.
Figure 2:
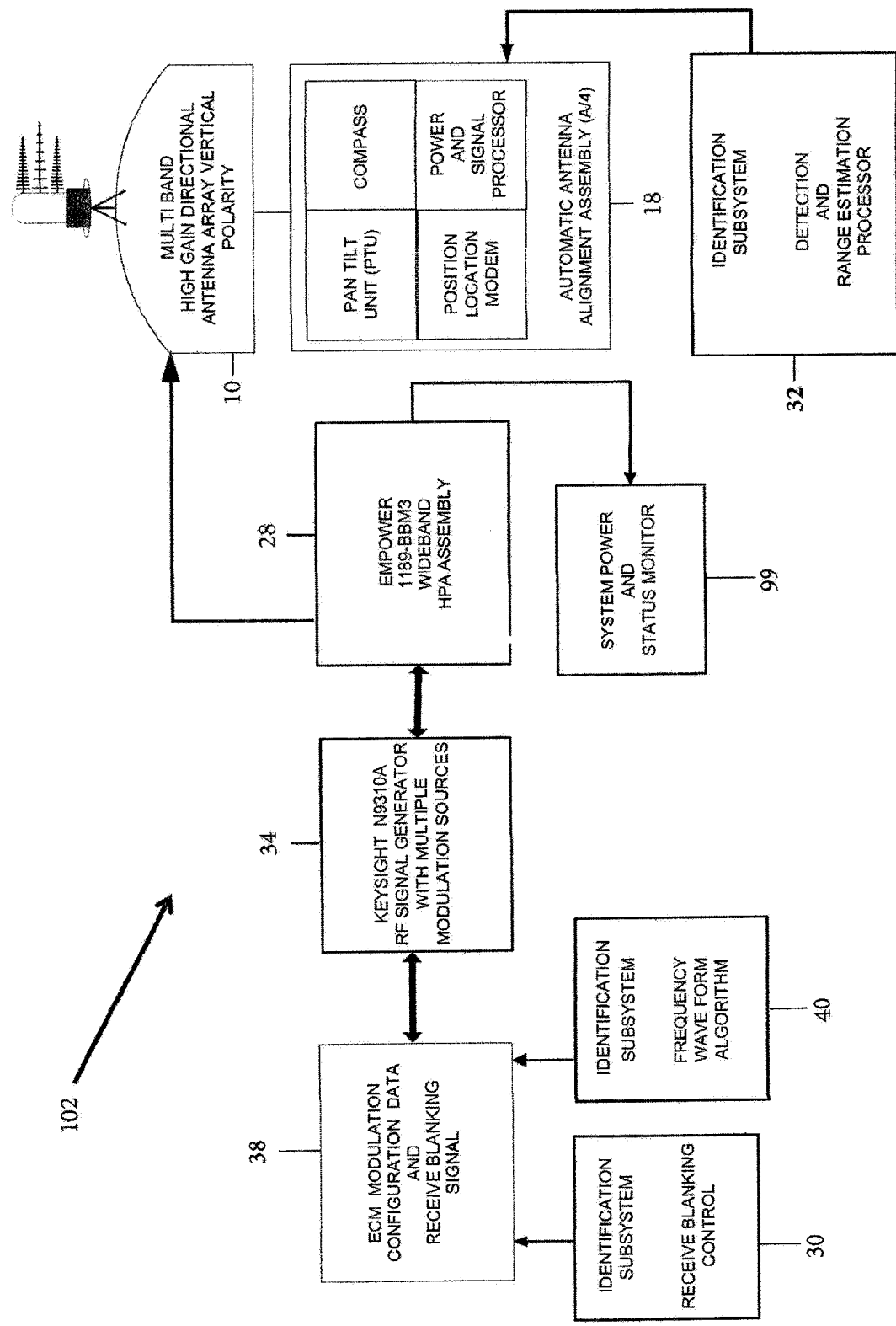
FIG. 2 is a schematic representation of a countermeasure and interdiction to UAS system of the integrated detection and countermeasure system for use against unmanned aerial systems, 44 of FIG. 1.
Figure 3:
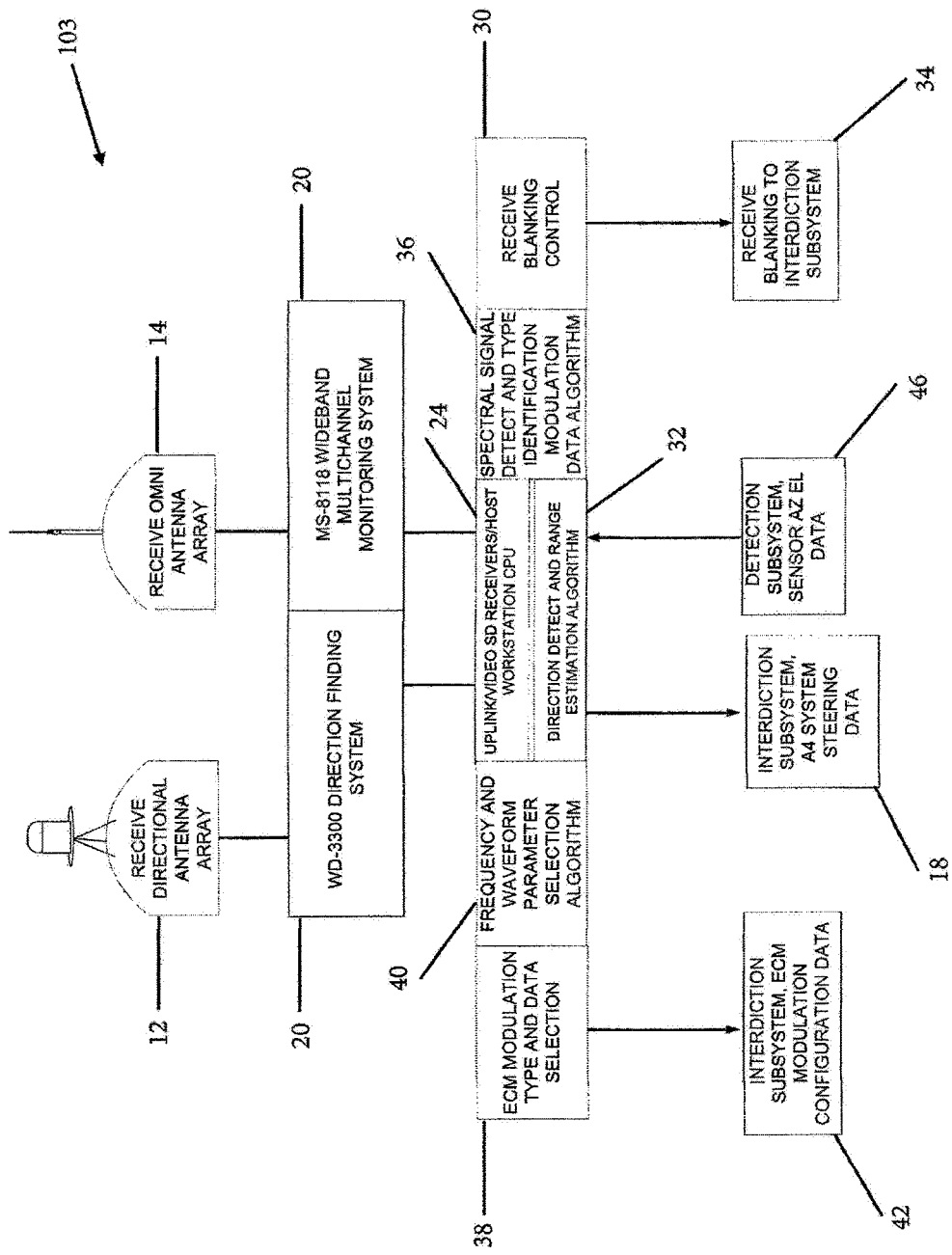
FIG. 3 is a schematic representation of the Radio Frequency (RF) detection system of the integrated detection and countermeasure system for use against unmanned aerial systems, 44 of FIG. 1.
Figure 4:
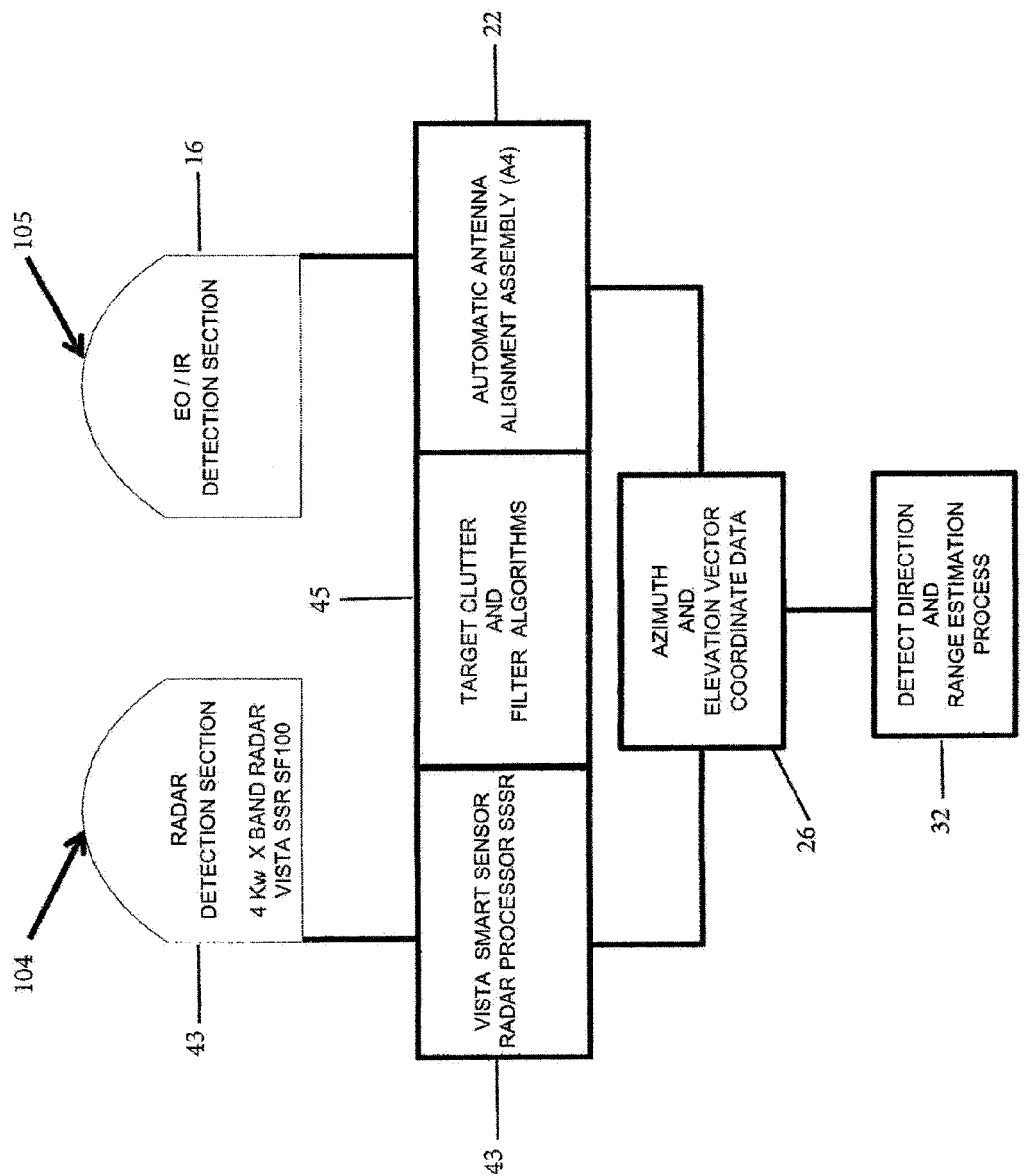
FIG. 4 is a schematic representation of the Radar detection system and Electro Optical and Infer Red (EO/IR) detection system of the integrated detection and countermeasure system for use against unmanned aerial systems, 44 of FIG. 1.

Algorithm—a process or set of rules to be followed in calculations or other problem-solving operations by a computer Automatic Antenna Alignment Assembly—designated as 18 in FIGS. 1, 2 and 3, and as 22 in FIGS. 1 and 4, is specialized electronic equipment specifically designed to automatically point the directional antennae and or camera, laser systems to the desired location, namely a small unmanned aerial vehicles/systems (sUAS) designated as a target 44 in FIG. 1, based on longitude and or latitude information gained or received by the receiving antennae, designated as 12 and 14 in FIGS. 1 and 3, and or radar antennae designated as 43 in FIGS. 1 and 4; this specialized equipment can be purchased from and is proprietary to EnrGies Engineering located in Huntsville, Ala.

Azimuth and Elevation Vector Coordinate Data—designated as 26 in FIGS. 1 and 4, is specialized algorithm software that has been developed to be used with a spherical coordinate system for three-dimensional space where three numbers specify the position of a point measured in latitude, longitude and elevation obtained from an EO/IR Sensor designated as 16 in FIGS. 1 and 4 that includes a Laser Range Finder, and/or Radar designated as 43 in FIGS. 1 and 4

Blanking—designated as 30 in FIGS. 1, 2 and 3 is the time between the last radio transmitting signal and the beginning of the next radio transmitting signal C2 Communications—Command and Control Communications links Commercial—relating to or engaged in commerce (i.e. NON-military)

Counter—to offer in response or act in opposition

CUASs2—Counter Unmanned Aerial Systems of Systems, the system of the present invention used to detect, identify and deter or interdict unmanned aerial vehicles or systems Directional Antenna—designated as 10 in FIGS. 1 and 2, and 12 in FIGS. 1 and 3, a class of directional or beam antenna that radiates greater power in one or more directions allowing for increased performance on transmits and receives and reduced interference from unwanted sources Direction Detection and Range Estimation—designated as 32 in FIGS. 1-4, is specialized algorithm software that has been developed to detect a suspected target or signal of interest and calculated to obtain the azimuth and distance to that target or signal of interest based on data obtained by the Radio Frequency (RF) detection section 103 in FIG. 3, the Radar detection section 104 in FIG. 4, and the Electro Optical and Infer Red (EO/IR) detection section 105 in FIG. 4

DF—designated as 12 in FIGS. 1 and 3, Direction Finding refers to the measurement of the direction from which a received signal was transmitted, this can refer to radio or other forms of wireless communication Drone—designated as 44 in FIG. 1, refers to an unmanned aircraft operated by remote control, allows for human correction (i.e. semi-autonomous), or autonomous, see also UAV, UAS, sUAS, RPA EAR—Export Administration Regulations are regulations that are administered by the United States Department of Commerce and regulate the export of "dual use" items; technology designed for commercial purposes and with potential military applications, such as computers, software, aircraft, and pathogens as well the re-export of items Electro-Optical and Infrared Sensors—designated as 16 in FIGS. 1 and 4, is a combination of a standard high definition video camera capable of viewing in daylight conditions and an infrared video camera capable of viewing in the infrared light perspective; both camera systems can be purchased "Off-The-Shelf" as common technology, one common manufacturer of this type of camera systems is FLIR Systems Electronic Counter Measure (ECM) Modulation Type Select—designated as 38 in FIGS. 1-3 is specialized algorithm software that has been developed to help narrow down the radio frequency identified by a modulation lookup table (defined in this glossary) of the specific unmanned aerial vehicle/system of interest, designated as a target 44 in FIG. 1, utilizing a database library that was created and categorized with the specific radio frequencies common to all unmanned aerial vehicles/systems Emitter—to send or give out a matter of energy EO—Electro-Optics is a branch of electrical engineering and materials science involving components, devices and systems that operate by modification of the optical properties of a material by an electric field, thus it concerns the interaction between the electromagnetic (optical) and the electrical (electronic) states of materials Frequency—the rate at which a vibration occurs that constitutes a wave, either in a material (as in sound waves), or in an electromagnetic field (as in radio waves and light), usually measured per second Frequency and Waveform Parameters—designated as 40 in FIGS. 1-3, Is specialized algorithm software that has been developed to identify unmanned aerial vehicles/systems utilizing a database library that was created and categorized with the specific radio frequency waveform common to all unmanned aerial vehicles/systems IR—infrared is invisible (to the human eye) radiant energy, electromagnetic radiation with longer wavelengths than those of visible light, extending from the nominal red edge of the visible spectrum at 700 nanometers (frequency 430 THz) to 1 mm (300 GHz)

ISR—Intelligence, Surveillance, Reconnaissance is an activity that synchronizes and integrates the planning and operation of sensors, assets, and processing, exploitation, and dissemination systems in direct support of current and future operations ITAR—International Traffic in Arms Regulations is a set of United States government regulations that control the export and import of defense-related articles and services on the United States Munitions List (USML)

Jam or Jammed or Jammers or Jamming—to interfere with or prevent the clear reception of broadcast signals by electronic means to become unworkable or to make unintelligible by sending out interfering signals by any means Laser—a device that emits light through a process of optical amplification based on the stimulated emission of electromagnetic radiation Laser Range Finder—designated as 16 in FIGS. 1 and 4, is a rangefinder which uses a laser beam, usually pulsed, to determine the distance to an object LED—Light-Emitting Diode is a semiconductor device that emits visible light when an electric current passes through it Matrix—an environment in which something develops Matrix Directional Transmit Antenna Array—designated as 10 in FIGS. 1 and 2, Is a signal processing technique used in sensor (Antenna) arrays for directional signal transmission; this is achieved by combining elements in a phased array in such a way that signals at particular angles experience constructive interference while others experience destructive interference; his equipment can be purchased "Off-The-Shelf" and one common manufacturer of this type of equipment is Motorola Mobile Platform (MP)—the mobile Counter Unmanned Aerial System of Systems equipment installed on any vehicle with the intent to move from one location to another location as needed to fulfill a short-term need in the detection, identification and deterrence or interdiction of an unmanned aerial vehicle Modulation—the process of varying one or more properties of a periodic waveform, called the carrier signal, with a modulating signal that typically contains information to be transmitted Modulation Function Generation—designated as 34 in FIGS. 1-3, Is specialized algorithm software that has been developed to transmit (Jam) a specific radio frequency, designated by 38 in FIGS. 1-3 and 42 in FIGS. 1 and 3, which is unique to a specific unmanned aerial vehicles/systems utilizing a database library that was created and categorized with the specific radio frequencies used on all common unmanned aerial vehicles/systems Modulation Lookup Table—designated as 42 in FIGS. 1 and 3, is specialized algorithm software that has been developed to identify the broad range of radio frequencies being used by a specific unmanned aerial vehicle/system of interest, designated as a target 44 in FIG. 1, utilizing a database library that was created and categorized with the specific radio frequencies common to all unmanned aerial vehicles/systems Multi-Band—a communication device that supports multiple radio frequency bands Multiband Low Noise Amplifier (LNA) Assembly—designated as 20 in FIGS. 1 and 3, is a multi-radio frequency electronic amplifier used to amplify possibly very weak signals, for example captured by an antenna Omni-directional Antenna—designated as 14 in FIGS. 1 and 3, a class of antenna which receives or transmits radio wave power uniformly in all directions in one plane, with the radiated power decreasing with elevation angle above or below the plane, dropping to zero on the antenna's axis OTS—Off The Shelf refers to materials or equipment that currently exists and is readily available for purchased or use Permanent Platform (PP)—the installation of the Counter Unmanned Aerial System of Systems equipment at a specific location to fulfill a long-term need in the detection, identification and deterrence or interdiction of an unmanned aerial vehicle Pulse—a single vibration or short burst of sound, electric current, light, or other wave RPA—Remotely Piloted Aircraft, aka UAV, UAS RF—Radio Frequency is a rate of oscillation in the range of around 3 kHz to 300 GHz, which corresponds to the frequency of radio waves, and the alternating currents that carry radio signals Receive Blanking—designated as 30 in FIGS. 1-3, is specialized algorithm software that has been developed to stop the receiving antennae, designated as 12 and 14 in FIGS. 1 and 3, from receiving radio frequency signals during the time that the counter measure transmitting frequency, designated as 34 in FIGS. 1-3, is being transmitted by directional transmitting antennae, designated as 10 in FIGS. 1 and 2, for the purpose of deterrence or interdiction of the suspect unmanned aerial vehicle/system, designated as a target 44 in FIG. 1, identified as a known threat Receive Directional Antenna Array—designated as 12 in FIGS. 1 and 3, refers to multiple receiving antennae arranged such that the superposition of the electromagnetic waves is a predictable electromagnetic field and that the currents running through them are of different amplitudes and phases; this equipment can be purchased "Off-The-Shelf" and one common manufacturer of this type of equipment is Motorola Receive Omni Antenna Array—designated as 14 in FIGS. 1 and 3, is a class of antenna that receives radio wave power uniformly in all directions in one plane; this equipment can be purchased "Off-The-Shelf" and one common manufacturer of this type of equipment is Motorola STC—Slew To Cue, the autonomous actions of electronic, radio or optical sensors to rotate using an automatic antenna alignment assembly designated as 18 in FIGS. 1-3, and 22 in FIGS. 1 and 4 to move and point cameras 16 in FIGS. 1 and 4 and countermeasures 10 in FIGS. 1 and 2 in the direction of a suspect target 44 in FIG. 1, based on input from data processed by components 26 in FIGS. 1 and 4, and 46 in FIGS. 1, 3 and 4, thus, keeping the "cued" targets in view at all times with or without human intervention Spectral Signal—designated as 36 in FIGS. 1 and 3, the frequency spectrum of a time-domain signal is a representation of that signal in the frequency domain Spectral Signal Detection and Type Identification—designated as 36 in FIGS. 1 and 3, is specialized algorithm software that has been developed to detect and identify unmanned aerial vehicles/systems utilizing a database library that was created and categorized with the spectral signatures common to all unmanned aerial vehicles/systems sUAS—designated as 44 in FIG. 1 small Unmanned Aerial System, usually weighing less than 20 kg or 55 lbs.

Target—designated as 44 in FIG. 1, something or someone of interest to be affected by an action or development Target Tracking Log—a graphic or table of coordinates documenting the target's path in space during area of concern Technology—the application of science, especially to industrial or commercial objectives Threat—a declaration or an act of an intention or determination to inflict the destruction of property or harm, punishment, injury or death of person(s)

UAS—designated as 44 in FIG. 1, Unmanned Aerial System, Unmanned Aircraft System (aka UAV, RPA)

UAV—designated as 44 in FIG. 1, Unmanned Aerial Vehicle, Unmanned Aircraft Vehicle (aka UAS, RPA)

Uplink—the part of a network connection used to send, or upload, data from one device to a remote device Uplink Video/Radio Transmitter Assembly—designated as 28 in FIGS. 1 and 2, is a device that will take the received radio or video frequency information from database libraries designated as 36 in FIGS. 1 and 3, 40 in FIGS. 1-3, and 42 in FIGS. 1 and 3 and send it through a radio amplifier designated as 34 in FIGS. 1-3 to a transmitting directional antenna or matrix directional transmit antenna array designated as 10 in FIGS. 1 and 2; this equipment can be purchased "Off-The-Shelf" and one common manufacturer of this type of equipment is Motorola Uplink/Video Standard Definition (SD) Receiver & Host Workstation—designated as 24 in FIGS. 1 and 3, is a connection from the antennae to the video encoder where the information is processed by the main computer network; the uplink equipment can be purchased "Off-The-Shelf" and one common manufacturer of this type of equipment is Cisco Systems; the video receiver and main computer is also "Off-The-Shelf" technology and are readily available from numerous manufacturers Vector—a quantity having direction as well as magnitude, especially as determining the position of one point in space relative to another Watt—the system unit of power, equivalent to one joule per second, corresponding to the power in an electric circuit in which the potential difference is one volt and the current one ampere Waveform—a graphic representation of the shape of a wave that indicates its characteristics as frequency and amplitude Referring to FIGS. 1-4 there are shown schematic representations of the components and function of an integrated detection and countermeasure system 100 for use against unmanned aerial systems 44. A first function of the system is locating and identifying a UAS target. The present invention provides integrated detection sections 103-105 and deterrent/countermeasure section 102 against small unmanned aerial vehicles/systems (sUAS), which are commonly referred to as drones, in the vicinity of, or approaching the vicinity of a property, place, event or very important person (VIP). All sUAS's have a distinct set of spectral signatures (sound, heat, radar cross section, radio frequency wave pattern) detected by a spectral signal identifier processor 36. This fact is the basis for the detection sections 103-105 of the system 100 of the present invention and sections 103-105 is the first function of the system. Using a proven high-end direction finding (DF) high fidelity RF receiver 24 coupled with omnidirectional and directional antennae 12, 14 and unique created software of the system when the RF signature of the sUAS flying within the system's detection boundaries is detected, for example within maximum lateral distance of about 2 kilometers (6560 feet) and within the aerial boundaries up to a maximum altitude of about 1.5 kilometers (4920 feet) above ground level (AGL). This element of the system may be augmented and is shown with additional signature detection elements consisting of acoustic and/or radar sensors 43 and electro optical sensors 16. These elements operate with unique software translating discernable signatures into coherent data aiding in the detection and location process. All signature data is then processed to generate a reference azimuth and elevation 26, 46 from the sensor to the subject sUAS 44. The information generated by the systems detection section is then passed electronically to the direction and range estimation processor 32 to yield a target's location. The system 100 of the present invention uses the hardware and software of the Radio Frequency (RF) detection section 103 to identify the type of sUAS and the associated known and observed radio frequencies signatures required for the sUAS communications and video data exchange.

A second function of the system is providing countermeasures against sUAS that is determined to be a threat in or approaching the vicinity of a property, place, event or VIP. Azimuthal data for a sUAS is determined by the detection section 103-105 of the system. The system's control software/hardware provides this information to the integrated Electro-Optical (EO) and Infrared (IR) sensor 16 which autonomously centers the field of regard of the EO/IR sensor to the known location of the subject sUAS 44. When the visual identification is confirmed to be a sUAS; by either video analytics or human verification, the system of invention's software/hardware will then determine the precise x, y, z coordinates (x=longitude, y=latitude, z=altitude) of the sUAS. This precise location and range information is provided to the countermeasure and deterrent section 102 of the system 100. Using this data the countermeasure and deterrent section 102 computes the RF spectral characteristics that will nullify signals that the sUAS expects to receive. A signal generator 34 produces a tailored signal and a variable strength amplifier 28 generates the output power required; causing the desired effect at the desired range to the subject sUAS 44. The countermeasure and deterrent section 102 broadcasts the unique generated RF waveform using highly directional and focused antennae 10. The system uses Blanking 30 at the time between the last radio transmitting signal and the beginning of the next radio-transmitting signal of the transmitted signal in accordance with the frequency and waveform parameters 40 to avoid negative internal effects to system 103. The system then disables the sUAS sensors, or causes the sUAS navigation system to malfunction due to communication interference causing most sUAS to enter a "Fail Safe Mode" (either land immediately or return to the launch point). This action is sUAS specific and is based on the manufacturer design and sUAS operational capabilities.

The interdict element of a system of the present invention interdicts the operation of an sUAS initially in a non-destructive manner, increasing to a destructive manner based on the response of the target sUAS. A system of the present invention may interdict the operation of a sUAS in a non-destructive manner by transmitting a concentrated Radio Frequency (RF) emission tuned to the specific sUAS characteristics identified by the spectral analysis during the detection process. These RF waveforms are then used to disrupt the expected inputs to the onboard controller of the identified sUAS. The video downlink signal is the initial target of the interdiction process. If this interruption is not sufficient to deter the sUAS, the RF transmitter will be tuned to the appropriate control frequency to disrupt the sUAS on-board electronics. These actions will cause most sUAS to enter the Fail Safe Mode (either land immediately or return to the launch point). The present invention considers the differences based on the manufacturer design and operational capabilities of the sUAS on a case-by-case basis and tailors the inventions countermeasure/deterrent response accordingly.

The countermeasure and deterrent section 102 of the system 100 interdicts the operation of an sUAS in a non-destructive manner by using the non-destructive technology described to generate a interdict transmission signal that is significantly stronger than control signals from an operator of the sUAS. This interdict transmission will have significantly higher gain (Stronger Signal) and target both the sensor and the control electronics of the sUAS. The interdiction process may be augmented with electro-magnetic pulse technology, pulsed laser and is specifically designed to accept other current or future counter-measures used to defeat the sUAS' electronics, motors and or navigation systems. The effects of the higher gain radio transmission will cause amongst other effects, servo-chatter, resulting in the loss of control of the sUAS and disruption of most on-board electronic processes increasing the probability of a forced landing. In addition, a counter sUAS can be dispatched with autonomous navigation data being supplied by the system of present invention to locate and intentionally disable the opposing sUAS by flying into it, dropping a net on the threat, covering it with spray foam or liquid or capturing the opposing sUAS.

The system of the present invention will use direction finding (DF) equipment 12, 16 to search for the radio communications link of an airborne sUAS 44, commonly referred to as a drone. Integrating multiple Direction Finding (DF) equipment 26, 46 to the system of the present invention will increase the precision in obtaining the azimuth that the sUAS is flying. Integrating radar equipment 43 provided with a radar clutter and target filter processor 45, with the direction finding (DF) equipment will provide the present invention the ability to determine with greater accuracy the altitude and azimuth of the sUAS 44 at the time of discovery and during the time it remains within the systems detection boundaries.

When the DF equipment 26, 46 has detected a communication link of a sUAS within the system boundaries, the receive host workstation 24 will analyze the radio frequency wave signature and confirm that the RF detected is from a sUAS. This process also applies when a radar unit 43 is integrated with the DF equipment.

The information obtained from DF 26, 46 and or radar unit 43 is then sent to the direction detect and range estimation unit 32 where algorithms will be used to send sUAS location coordinates to the Automatic Antenna Alignment Assembly (A4) 22, 18. Put another way, using Slew To Cue, the autonomous actions of electronic, radio or optical sensors to rotate using an automatic antenna alignment assembly 18, 22 to move and point cameras 16 and countermeasures in the direction of a suspect target 44 based on input from data processed by the azimuth and elevation unit 26 46, thus, keeping the "cued" targets in view at all times with or without human intervention. This information will then direct the Automatic Antenna Alignment Assembly (A4) 22 to point the Electro-Optical and Laser Range Finding unit 16 at the sUAS to allow for visual confirmation, distance and elevation of the sUAS to be known.

The information obtained by the Laser Range Finding equipment will be sent to the Azimuth and Elevation Vector Coordinate Data unit 26 which will send exact azimuth and elevation information to the A4 system 18 controlling the Matrix Directional Transmit Antenna Array 10 via the Direction Detect and Range Estimation unit 32.

When the communications link between the subject sUAS and its' operator is detected by the Radio Frequency (RF) detection section 103 of the system the information is passed through the Multiband LNA Assembly 20 and through the Uplink Receive Host Workstation 24. The information is then sent to the Spectral Signal Detect and Type Identification unit 36 where the type of sUAS is determined based on a known database containing Spectral Signal Wave information 36. When the Spectral Signal Wave information is known the information is sent to the Frequency and Wave Form Parameters unit 40 where the analyzed RF data is sent to the Modulation Look Up Table 42. When the Modulation information is known the information is then sent to the ECM Modulation Type Select unit 38.

The selected modulation waveform is then sent to the Uplink Video Transmitter Assembly 28 that unit works in conjunction with the Receive Blanking unit 30. When the Uplink Video Transmitter 28 is transmitting a radio signal the Receive Blanking unit 30 will force the DF antennae 12, 14 to stop receiving the radio frequency being transmitted by the Matrix Directional Transmit Antenna Array 10. The radio frequency selected to disrupt the communication link of the sUAS with its' operator is then transmitted by the Transmitter Assembly 28 using the Matrix Directional Transmit Antenna Array 10 aimed at the sUAS 44 via the Automatic Antenna Alignment Assembly 18.

While the invention has been described with reference to certain exemplary embodiments, obvious modifications and alterations are possible by those skilled in the related art. Therefore, it is intended that the invention include all such modifications and alterations to the full extent that they come within the scope of the following claims or the equivalents thereof.

What is claimed is:

1. A multi-sensor system providing integrated detection and a countermeasure against unmanned aerial vehicles, the multi-sensor system comprising:
   a radar for detecting the 3D position of an unmanned aerial vehicle in flight;
   a radio frequency receiver for identifying the unmanned aerial vehicle in flight based on at least one radio transmission from the unmanned aerial vehicle;
   a location processor operatively coupled to the radar and the radio frequency receiver, the location processor determining the location of the unmanned aerial vehicle in flight based on the radar position detection and the RF receiver identification; and
   the countermeasure operatively coupled to the location processor and comprising at least one of a radio frequency transmitter and a kinetic effect, the location processor being further structured to selectively at least one of (a) control interdiction of the unmanned aerial vehicle in flight using a specific RF jamming frequency transmitted by the radio frequency transmitter, and (b) control deployment of the kinetic effect.

2. The multi-sensor system providing integrated detection and a countermeasure against unmanned aerial vehicles of claim 1 wherein the kinetic effect comprises a non-destructive device.

3. The multi-sensor system for providing integrated detection and a countermeasure against unmanned aerial vehicles of claim 1 wherein the kinetic effect comprises a destructive device.

4. The multi-sensor system for providing integrated detection and a countermeasure against unmanned aerial vehicles of claim 1 wherein the kinetic effect comprises both a non-destructive device and a destructive device.

5. A system for providing integrated detection and countermeasures against unmanned aerial vehicles comprising:
   (a) a direction finding high fidelity RF receiver coupled with a receiving omnidirectional antenna and a receiving directional antenna for detecting the RF signature of a flying unmanned aerial vehicle, and a spectral signal identifier processor for analyzing the RF signature to identifying a set of spectral signatures of the unmanned aerial vehicle;
   (b) a radar system provided with a radar clutter and target filter processor for providing input to an azimuth and elevation vector coordinate data processor for determining the location of the unmanned aerial vehicle; and
   (c) a signal generator that produces at least one tailored signal based on the spectral signatures of the unmanned aerial vehicle and a variable strength amplifier that generates an output power, an antenna alignment assembly for adjusting the alignment of a transmitting directional and focused antenna based on the location of the unmanned aerial vehicle as determined by the azimuth and elevation vector coordinate data processor, the signal generator and amplifier coupled with the transmitting antenna to send at least one signal to the unmanned aerial vehicle to alter at least one of the speed, direction and altitude of the unmanned aerial vehicle.

6. The system for providing integrated detection and countermeasures against unmanned aerial vehicles of claim 5 further comprising: a Multiband LNA Assembly for receiving signals from the receiving omnidirectional and receiving directional antennae and transmitting signals to an Uplink Receive Host Workstation which sends information to the spectral signal identifier processor where the type of unmanned aerial vehicle is identified using a database of known Spectral Signal Wave information for known unmanned aerial vehicles, and a Frequency and Wave Form Parameters unit coupled to a Modulation Look Up Table coupled to an ECM Modulation Type Select unit that is coupled to the signal generator that produces at least one tailored signal.

7. The system for providing integrated detection and countermeasures against unmanned aerial vehicles of claim 6 further comprising a Receive Blanking unit that forces the receiving omnidirectional and a receiving directional antennae to stop receiving a radio frequency being transmitted by the transmitting directional and focused antenna.

* * * * *